May 20, 1969

H. P. BEUTNER ET AL 3,445,356

SYNTHESIS OF IRON ENNEACARBONYL

Filed Aug. 25, 1966

Sheet 1 of 2

INVENTORS
CHARLES EDWARD O'NEILL
HEINZ PAUL BEUTNER

BY

M. L. Pinel
ATTORNEY

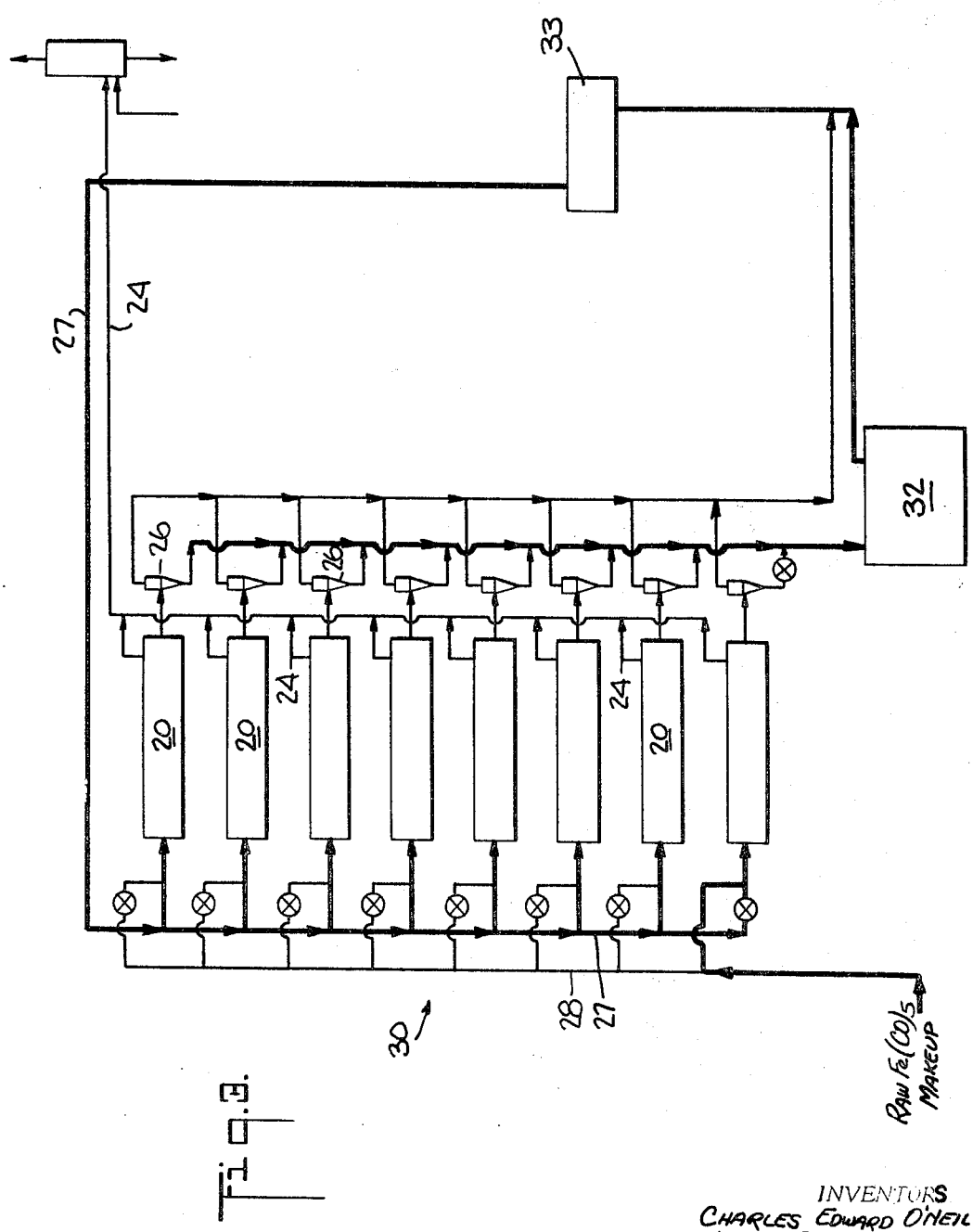

3,445,356
SYNTHESIS OF IRON ENNEACARBONYL
Heinz Paul Beutner, Arlington, Mass., and Charles Edward O'Neill, Upper Montclair, N.J., assignors, by direct and mesne assignments, to The International Nickel Company, Inc., New York, N.Y., a corporation of Delaware
Filed Aug. 25, 1966, Ser. No. 575,032
Int. Cl. C01g 49/16; B01j 1/10
U.S. Cl. 204—157.1                                10 Claims The present invention relates to the commercial production of iron enneacarbonyl and apparatus therefor, and more particularly to a commercial photochemical process for the production of iron enneacarbonyl from iron pentacarbonyl.

It has long been known that iron pentacarbonyl on exposure to sunlight reacts to form iron enneacarbonyl and carbon monoxide. Laboratory investigations have further shown that certain wavelengths are more effective than others in promoting the iron enneacarbonyl reaction. Although the influence of light on iron pentacarbonyl has been studied, the results have been mainly of academic interest and no process, as far as we are aware, has been developed for producing iron enneacarbonyl on a continuous and commercial scale.

It has now been discovered that iron enneacarbonyl can be economically produced through a photochemical reaction.

It is an object of the present invention to provide an economical process for photochemically producing iron enneacarbonyl from iron pentacarbonyl.

Another object of the invention is to provide a continuous process for the photosynthesis of iron enneacarbonyl without undue light losses.

The invention also contempelates providing a process for increasing the efficiency of light in promoting, on a continuous scale, the photochemical production of iron enneacarbonyl.

It is a further object of the invention to provide apparatus suitable for utilization of light to a greater extent in promoting the photosynthesis of iron enneacarbonyl.

The invention further contemplates providing apparatus for the production of iron enneacarbonyl on a continuous industrial scale.

Figure 1:
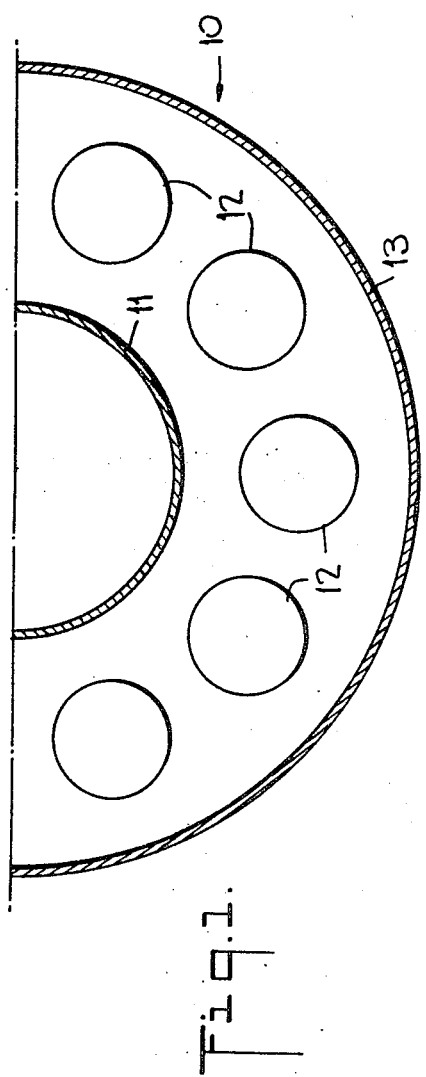
Figure 2:
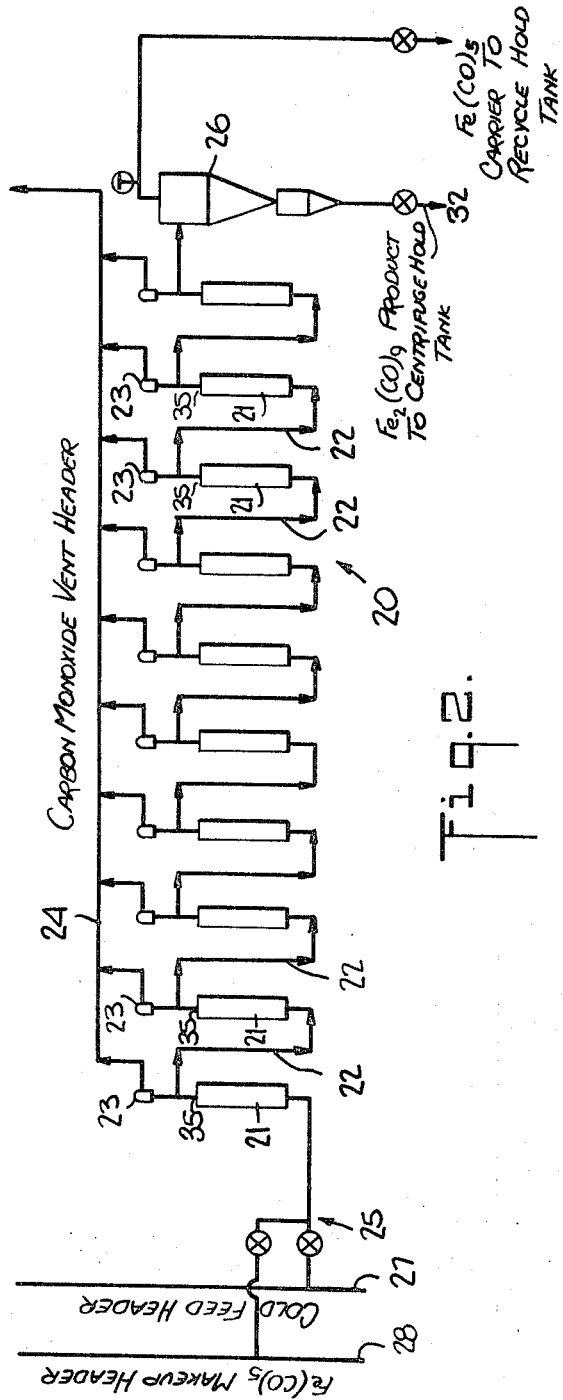

Other objects and advantages will become apparent from the following description taken in conjunction with the accompanying drawing in which:

FIG. 1 depicts a schematic cross sectional view of a single photochemical reactor unit of the present invention;

FIG. 2 shows a schematic drawing of a train of double reactor units of the invention through which iron pentacarbonyl is flowed and reacts on the exposure to light to form iron enneacarbonyl; and FIG. 3 illustrates a schematic drawing of a plant consisting of a number of trains with provisions for continuously recycling unreacted iron pentacarbonyl through a heat exchanger and then back through the trains to expose the iron pentacarbonyl to light to form additional iron enneacarbonyl.

Generally speaking, the present invention contemplates exposing a flowing stream of essentially pure iron pentacarbonyl maintained at a temperature below room temperature to a source of light having advantageously a high percentage, such as about 80% to about 100% of its intensity in the wave length range of about 400 millimicrons to about 700 millimicrons whereby the iron pentacarbonyl reacts to form iron enneacarbonyl and carbon monoxide.

The term "essentially pure iron pentacarbonyl" as used herein encompasses liquid iron pentacarbonyl substantially devoid of contaminants which either undesirably inhibit the formation of iron enneacarbonyl or absorb light within the effective wavelengths. This term also includes liquid iron pentacarbonyl substantially devoid of the abovedescribed contaminants dissolved in a solvent which neither adversely affects the chemical reaction nor absorbs light in the effective wavelength range. The importance of starting with essentially pure iron pentacarbonyl will be demonstrated hereinafter in conjunction with other aspects of the invention including the effects of the temperature of operation.

Our process is advantageously conducted in the reactor depicted in FIGURE 1. The reactor 10 comprises a glass cylinder 11 which is advantageously made of optical grade glass having a coefficient of transmission of about 0.9 to about 1.0 for wavelengths of light in the range of 400 m$\mu$ to 700 m$\mu$. Satisfactory types of glass include optical grades of flint, crown or borosilicate. Concentrically surrounding the glass cylinder 11 and parallel to the longitudinal axis of the glass cylinder are arranged sources of light 12 such as fluorescent light tubes having a high output of light in the wavelengths of 450 m$\mu$ to 600 m$\mu$. Losses of light within the advantageous wavelengths from radiation of light sources 12 away from the glass cylinder 11 and also light reflected from glass cylinder 11 are reduced by providing a reflector baffle 13 which concentrically surrounds the arranged light sources 12 and the glass cylinder 11 and is parallel to the longitudinal axis of the glass cylinder.

The radius and length of glass cylinder 11 are dependent on the operating conditions including the concentration and temperature of the essentially pure iron pentacarbonyl and the proportion of light within the advantageous wavelength range generated by the light sources 12. Essentially pure iron pentacarbonyl obeys Beer's law, i.e., the quantity of light absorbed by essentially pure iron pentacarbonyl is proportional to the length of the path the light traverses and is proportional to the molecular concentration of essentially pure iron carbonyl in the path which the light traverses. Thus, the radius of the glass cylinder is selected so that a substantial portion of the light entering the glass cylinder within the advantageous wavelength range is absorbed by the time it reaches the longitudinal axis of the glass cylinder. The length of the glass cylinder is dependent on the concentration and temperature of the essentially pure iron pentacarbonyl and the efficiency of the light sources in generating light within the advantageous wavelengths. The proper length of the glass cylinder is that length in which the temperature of the essentially pure iron pentacarbonyl will not rise to levels described hereinafter and in which the concentration of the products of reaction does not increase to levels at which high proportions of the advantageous wavelengths are absorbed thereby.

When carrying out our process on a continuous industrial scale, two single units as described above are joined together to form a double unit. The double units are formed into a train as is generally depicted at 20 in FIGURE 2. The double units 21 are connected in series by conduits 22. At the exit end 35 of each double unit 21 generated carbon monoxide is drawn off through float type vapor vents 23 to carbon monoxide vent header 24 for future use. Liquid iron pentacarbonyl is introduced into the first double unit in the series through inlet 25 which receives cooled liquid iron pentacarbonyl recycled from the separation means, e.g., cyclone, 26 through feed header 27 and makeup cooled liquid iron pentacarbonyl from makeup header 28. As shown in FIGURE 3 a number of trains 20 can be joined together in parallel to form an entire plant generally indicated at 30 to reduce capital equipment costs such as additional heat exchangers, pumps, etc. The slurry of iron enneacarbonyl in liquid iron pentacarbonyl recovered from separation means 26 are conducted through the iron enneacarbonyl header 31 to the separator, e.g., centrifuge, 32 to achieve a more complete separation of the product iron enneacarbonyl. Liquid iron pentacarbonyl recovered from separators 26 and 32 is combined and sent to heat exchanger 33 from which the cooled liquid iron carbonyl is recycled through feed header 27. Cooled makeup liquid iron pentacarbonyl is continuously added through makeup feeder 28 to compensate for the loss of iron pentacarbonyl through the photochemical reaction.

In carrying the invention into practice, it is preferred to irradiate flowing esesntially pure iron pentacarbonyl at a temperature of about −20° C. to about +20° C. with light within the wavelength of about 400 m$\mu$ to 600 m$\mu$. The production of one pound of iron enneacarbonyl requires at least 93 watt hours of light in the specified wavelength range and a more practical quantity is 300 watt hours per pound of product. After the concentration of iron enneacarbonyl reaches about 2 grams per liter, e.g., 0.15 mole percent, the essentially pure iron pentacarbonyl is separated from the solid iron enneacarbonyl. If, after separation, the temperature of the substantially pure iron pentacarbonyl is below about +10° C., the essentially pure iron pentacarbonyl is again exposed to light within the wavelength of about 400 m$\mu$ to about 600 m$\mu$. Before re-exposing the separated essentially pure iron pentacarbonyl to the light, makeup essentially pure iron pentacarbonyl can be added to adjust both the volume and the temperature. In the event that the temperature of the essentially pure iron pentacarbonyl has reached about +10° C. or higher, the essentially pure iron pentacarbonyl is conducted to a heat exchanger to lower its temperature to at least about −10° C. Carbon monoxide, another product of the reaction, is continually withdrawn. Advantageously, the depth of the flowing essentially pure iron pentacarbonyl is controlled such that the depth does not exceed that which is necessary to fully absorb light within the wavelength of about 400 m$\mu$ to about 600 m$\mu$ and partially absorb light above 600 m$\mu$.

It has been found that for a commercial process the light should consist to the greater extent of light within the wavelengths of about 400 m$\mu$ to about 600 m$\mu$ because wavelengths below 400 m$\mu$ are absorbed so rapidly that iron enneacarbonyl is deposited on the window and soon halts the reaction by blocking admission of the light and at wavelengths above about 600 m$\mu$ excessively long paths through the iron pentacarbonyl must be provided. At even longer wavelengths, such as above 1000 m$\mu$, substantial quantities of the light are dissipated as heat.

In describing in more detail the limits of desirable light we refer to Table V which gives the path-lengths which must be provided to achieve essentially complete (namely 99%) absorption of light in essentially pure iron pentacarbonyl. At 400 m$\mu$ the light is essentially completely absorbed in a layer of 0.056 mm. of essentially pure iron pentacarbonyl. If the density of light of 400 m$\mu$ at the window to the iron carbonyl is very high, a large amount of iron enneacarbonyl is formed at the interface between the glass and the liquid iron pentacarbonyl and forms a film or crust of the solid iron enneacarbonyl on the window, blocking the admission of further light. Since it is difficult to clean the window by scraping or rapid flow of the liquid we prefer to keep the density of light of 400 m$\mu$ and wavelengths below this limit at the interface as low as possible, preferably close to zero. This can be achieved by providing appropriate light filters around the reaction pipe, on the reflector wall or around the light source. Advantageously, however, the light source itself should be selected so that it does not contain more than a negligible amount of its light intensity in a wavelength below 400 m$\mu$.

The pathlength required for essentially complete (99%) absorption increases rapidly with increasing wavelength of the light and reaches 28 cm. at a wavelength of 600 m$\mu$. Although light of longer wavelengths is not harmful and can also be utilized for the photochemical reaction, such light is not considered as very useful since very thick layers of essentially pure iron pentacarbonyl would have to be provided to fully utilize such light. The most advantageous wavelength range is from about 450 to about 550 millimicrons. The necessary pathlength layer of essentially pure iron carbonyl for this range is from about 0.8 mm. to about 3.7 cm. The light source which we consider most useful for our process should have its maximum of light output between 450 and 550 m$\mu$ and have only negligible output of light below 400 m$\mu$.

The advantageous wavelength range is shifted toward shorter wavelengths when the iron pentacarbonyl is diluted with organic solvents. As a result of Beer's law the path length required for 99% absorption is inversely proportional to the concentration of iron pentacarbonyl. For example when the concentration of iron pentacarbonyl is one tenth of pure iron pentacarbonyl, the desirable wavelength range is shifted roughly by 50 millimicrons toward shorter wavelengths.

Another consideration closely associated with the useful wavelengths of light is the purity of the starting iron pentacarbonyl. The efficiency of photosynthesis of iron enneacarbonyl from iron pentacarbonyl is markedly affected by the presence of dissolved impurities such as iron enneacarbonyl [$Fe_2(CO)_9$], iron tetracarbonyl [$Fe_3(CO)_{12}$], dicobalt octacarbonyl [$Co_2(CO)_8$], cobalt iron carbonyl sulfide [$Co_2Fe(CO)_9S$] and nickel carbonyl [$Ni(CO)_4$]. Iron enneacarbonyl at room temperature is a gold to orange crystalline solid which is virtually insoluble in most organic solvents and water but does display limited solubility in iron pentacarbonyl. Iron enneacarbonyl dissolved in iron pentacarbonyl results in an intensely yellow colored solution which increases the absorption of light over that of essentially pure iron pentacarbonyl. This absorption decreases the efficiency of the photochemical reaction since the absorbed light is not available to activate decomposition of iron pentacarbonyl. Dispersed but undissolved iron enneacarbonyl also absorbs light in the range of about 400 m$\mu$ to about 600 m$\mu$ and dissipates this light in the form of heat and therefore reduces the efficiency of the photochemical reaction. The disadvantages associated with dissolved iron enneacarbonyl are avoided by employing substantially pure iron pentacarbonyl which contains less than about $3 \times 10^{-4}$ mole of dissolved iron enneacarbonyl. Dissolved $Fe_3(CO)_{12}$ (iron tetracarbonyl), $Co_2Fe(CO)_9S$ (cobalt iron carbonyl sulfide) and $Co_2(CO)_8$ (cobalt carbonyl) likewise interfere with the photochemical reaction because $Fe_3(CO)_{12}$ has a dark green color which displays increasing absorption coefficients for decreasing wavelengths with maxima at 610 m$\mu$, 440 m$\mu$ and 280 m$\mu$, $Co_2Fe(CO)_9S$ is black which displays a continuously increasing absorption coefficient for light of decreasing wavelengths and $Co_2(CO)_8$ has a dark color which renders the photochemical reaction less efficient. Although nickel carbonyl is colorless, it also decreases the efficiency of the photochemical reaction but by a different mechanism. Thus, for the most effective utilization of light, the aforesaid impurities should be controlled so that the iron pentacarbonyl contains, per mole of iron pentacarbonyl, less than about $10^{-6}$ mole $Fe_3(CO)_{12}$, less than about $10^{-6}$ mole $Co_2Fe(CO)_9S$, less than about $10^{-2}$ mole $Co_2(CO)_8$ and less than $10^{-2}$ mole $Ni(CO)_4$. As stated hereinbefore, iron pentacarbonyl can be diluted with solvents which do not adversely affect the photosynthesis efficiency. Many organic solvents such as acetic acid, petroleum ether, benzene, toluene, and hexane can be used. When organic solvents are employed, the concentration of pure iron pentacarbonyl can be from about 1% to about 95%, e.g., about 5% to about 50%. Glacial acetic acid has been found to be a particularly advantageous solvent. An advantageous feature stemming from the use of colorless organic solvents, e.g., glacial acetic acid, for iron pentacarbonyl is that iron enneacarbonyl is nearly insoluble in most organic solvents and dilution of iron pentacarbonyl with organic solvents decreases iron enneacarbonyl dissolution in iron pentacarbonyl.

Data in Table I confirm that the presence of detrimental impurities such as $Fe_3(CO)_{12}$, $Co_2Fe(CO)_9S$, $Ni(CO)_4$ and a blue anthraquinone dye drastically reduce the efficiency of the photochemical reaction. The tests were conducted using an optical grade borosilicate glass flask containing iron pentacarbonyl which was exposed to light generated by an incandescent lamp having a high output in the range of 500 m$\mu$ to 600 m$\mu$. Confirmation that the effects of loss of light efficiency in the case of $Ni(CO)_4$ is not the result of iron pentacarbonyl dilution is shown by two tests in which a solution 0.45 mole of $Ni(CO)_4$ in 6.98 moles of $Fe(CO)_5$ was compared with a solution of 1.78 moles of acetic acid in 6.71 moles $Fe(CO)_5$. In the former test a light loss of 28.9% was observed whereas in the latter test with even greater dilution of the $Fe(CO)_5$ no light loss was observed. The results are tabulated in terms of the percentage of light loss and the carbon monoxide yield relative to pure iron pentacarbonyl.

TABLE I

| Impurity or solvent | Conc. $Fe(CO)_5$, moles | Conc. of impurity or solvent, moles | CO Yield, relative to pure $Fe(CO)_5$, percent | Light loss, percent |
|---|---|---|---|---|
| None | 7.4 | | 100 | 0 |
| Acetic acid | 6.71 | 1.78 | 100 | 0 |
| $Fe_3(CO)_{12}$ | 7.4 | 6.5×10⁻⁴ | 27.4 | 72.6 |
| $Fe_3(CO)_{12}$ | 7.4 | 2.4×10⁻³ | 8.4 | 91.6 |
| $Co_2Fe(CO)_9S$ | 7.4 | 3.8×10⁻⁵ | 62.2 | 37.0 |
| $Co_2Fe(CO)_9S$ | 7.4 | 2.9×10⁻⁴ | 44.0 | 56.0 |
| $Ni(CO)_4$ | 7.38 | 5.3×10⁻² | 82.9 | 17.1 |
| $Ni(CO)_4$ | 6.98 | 4.5×10⁻¹ | 71.1 | 28.9 |
| $Ni(CO)_4$ | 6.63 | 8.1×10⁻¹ | 47.4 | 52.6 |
| Anthraquinone dye–acetic acid | 4.5 | {5.1×10⁻⁵, 7.24} | ¹47 | 53.0 |

¹ On a basis of 4.5 moles $Fe(CO)_5$ in acetic acid.

The loss of efficiency of the photochemical reaction due to dissolved iron enneacarbonyl is closely related to the control of the temperature of the iron pentacarbonyl as will be shown by Tables II to VI. The solubility of iron enneacarbonyl in iron pentacarbonyl is dependent on the temperature of the iron pentacarbonyl as shown by Table II. The results in Table II were obtained by saturating iron pentacarbonyl with iron enneacarbonyl at the temperature being studied and then evaporating the iron pentacarbonyl in a vacuum at room temperature. The residue, mainly iron enneacarbonyl, was analyzed for iron content by titration.

TABLE II

Temp., ° C.:      Conc. of $Fe_2(CO)_9$ in $Fe(CO)_5$, mole/liter
0 ------------------------------------------------ 1.34×10⁻³
26 ----------------------------------------------- 2.35×10⁻³

Light losses attributed to increasing quantities of dissolved iron enneacarbonyl as the temperature of the iron pentacarbonyl increases are shown in Table III. The results in Table III show that at lower temperatures light losses for the same wavelength light are reduced due to the reduced solubility of iron enneacarbonyl in iron pentacarbonyl at lower temperatures. It is also shown by the data that at a constant iron enneacarbonyl concentration in iron pentacarbonyl light losses increase for increasing wavelengths.

TABLE III

| Temp., °C. | Light losses at various wavelengths, percent | | | | | |
|---|---|---|---|---|---|---|
| | 450 m$\mu$ | 500 m$\mu$ | 550 m$\mu$ | 600 m$\mu$ | 650 m$\mu$ | 700 m$\mu$ |
| 25 | 18 | 20 | 27 | 39 | 59 | 98 |
| 20 | 16 | 18 | 25 | 36 | 54 | 90 |
| 10 | 13 | 14 | 20 | 29 | 43 | 72 |
| 0 | 10 | 11 | 15 | 22 | 33 | 55 |
| −10 | 6.7 | 7.5 | 10 | 15 | 23 | 38 |

A further reason for operating below room temperature is that iron enneacarbonyl in the presence of iron pentacarbonyl at temperatures above about 25° C. reacts to form iron tetracarbonyl which has been shown to have deleterious effects on the photochemical reaction.

The efficiency of the photochemical reaction can further be controlled by providing a pathlength for light within the range of about 5 cm. to about 50 cm. through the iron pentacarbonyl such that 99% of the light within the specified wavelengths is absorbed. Pathlength requirements are directly proportional to the wavelengths of the light source as is shown in Tables IV, V and VI. Table IV shows the longest wavelengths that will be absorbed to a given degree for varying pathlengths as based on the absorption coefficients for essentially pure iron pentacarbonyl. Table V shows the pathlength necessary to absorb 99% of a given wavelength of light in iron pentacarbonyl of high purity.

TABLE IV

| Absorption, percent | 5 cm. pathlength, m$\mu$ | 15 cm. pathlength, m$\mu$ | 50 cm. pathlength, m$\mu$ |
|---|---|---|---|
| 99 | 556 | 582 | 612 |
| 90 | 572 | 600 | 630 |
| 50 | 598 | 630 | 660 |
| 10 | 650 | 670 | 694 |

TABLE V

| Wavelength, m$\mu$ | Pathlength for 99% absorption at 25° C., cm. |
|---|---|
| 250 | 3.09×10⁻⁵ |
| 300 | 5.89×10⁻⁴ |
| 350 | 1.38×10⁻³ |
| 400 | 5.63×10⁻³ |
| 450 | 7.95×10⁻² |
| 500 | 0.83 |
| 550 | 3.72 |
| 600 | 28.2 |
| 650 | 240 |
| 700 | 5020 |

In Table VI the percent of light which can in practice be utilized for the photochemical reaction is shown for various wavelengths at several pathlengths taking into consideration the solubility of iron enneacarbonyl in liquid iron pentacarbonyl at a given temperature. One can see that for practical purposes light of wavelengths longer than 600 m$\mu$ loses rapidly in usefulness. Also it becomes apparent that it is desirable to carry out the reaction at a low temperature since the degree of light utilization increases with decreasing solubility of iron enneacarbonyl.

TABLE VI

| Wavelength, m$\mu$ | Percent of light which can be utilized for the photochemical reaction | | | |
|---|---|---|---|---|
| | 5 cm. pathlength 20° C. | 15 cm. pathlength 20° C. | 15 cm. pathlength −10° C. | 50 cm. pathlength 20° C. |
| 450 | 83 | 83 | 93 | 83 |
| 500 | 81 | 81 | 91 | 81 |
| 550 | 74 | 74 | 90 | 74 |
| 600 | 31 | 58 | 77 | 65 |
| 650 | 2 | 11 | 29 | 30 |
| 700 | | 1 | 1 | 2 |

Another aspect of the invention is to control the wavelength of the irradiating light not only for maintaining a smooth and efficient operation but also to control the heat generated by this light in the photochemical reaction. Within the wavelengths of 400 m$\mu$ to 700 m$\mu$ a mole of iron enneacarbonyl will be formed by absorption of about 71.8 kilocalories to about 41.1 kilocalories of energy. Essentially all of this energy ends up as heat. Therefore it is desirable to use predominantly light with longer wavelengths and lower energy to minimize the need for cooling.

For the purpose of giving those skilled in the art a better understanding of the invention and/or a better appreciation of the advantages of the invention, the following illustrative examples are given:

Example I

A 15 watt green fluorescent lamp which has a maximum light output at a wavelength of 530 m$\mu$ and a total output of 1200 lumens (or about 0.033 Einstein per hour) was surrounded by a concentric layer of essentially pure, freshly distilled iron pentacarbonyl and a concentric mantle of cooling water at 15° C. The rate of carbon monoxide evolution was observed during the photochemical reaction. The initial rate was 0.24 liter per hour. In a period of several hours, the rate of carbon monoxide production declined because solid iron enneacarbonyl accumulated in the reactor and decreased the photochemical efficiency. The initial rate of carbon monoxide production is equivalent to the production of 3.2 grams of iron enneacarbonyl per hour. The achieved conversion ratio is 4.7 Einsteins or about 300 watt hours of light per pound of iron enneacarbonyl, equivalent under these conditions to an electric power demand of about 2.1 kwh. per pound of iron enneacarbonyl.

Example II

The test as described in Example I was repeated using commercial iron pentacarbonyl which contained traces of iron tetracarbonyl and other impurities. The initial rate of carbon monoxide evolution was 0.16 liter per hour, which is equivalent to the production of 2.1 grams of iron enneacarbonyl per hour.

Example III

The test as described in Example I was carried out with a 15 watt fluorescent tube which was described as cool white and which had a high output between 550 and 600 m$\mu$ but also had a significant portion of its light at wavelengths below 450 m$\mu$. The test resulted in the formation of a crust of iron enneacarbonyl on the window walls within several hours, thus obstructing the passage of light so that the production of iron enneacarbonyl came virtually to a standstill.

Example IV

A one-liter optical grade borosilicate glass flask equipped with stirrer and surrounded by a constant temperature bath fed by tap water was charged with a constant volume of iron pentacarbonyl. The liquid was irradiated by a 1000 watt incandescent photoflood lamp mounted at a distance of 12 inches from the flask center. At a distance of 6 inches a window opening of 4 x 3 inches singled out a light beam with the rest of the light output shielded off. The incandsecent light source had a high output in the long wavelength end of the visible spectrum and in the infrared, but had virtually no intensity at wavelengths below 450 m$\mu$. Iron pentacarbonyl of various quality was exposed to the light beam for periods of 1 hour and the yield of iron enneacarbonyl was determined after filtration and weighing of the solid precipitate. Results were as follows:

| Fe(CO)$_5$ quality: | Yield (gms.) |
| --- | --- |
| Freshly distilled high purity Fe(CO)$_5$ | 6.4 |
| High purity Fe(CO)$_5$ after light exposure stored at room temperature for periods of— | |
| 1 day | 5.4 |
| 2 days | 4.8 |
| 3 days | 4.2 |
| Commercial grade Fe(CO)$_5$ | 4.7 |

The results demonstrate the deleterious effect of maintaining iron pentacarbonyl at room temperature or above after it was exposed to light. The aging of the liquid iron pentacarbonyl is accompanied by a visible color change from bright orange to dull red and is the result of the formation of traces of iron tetracarbonyl, Fe$_3$(CO)$_{12}$ from iron enneacarbonyl which was present in dissolved form.

Example V

Essentially pure and undiluted iron pentacarbonyl at a temperature of about −10° C. was passed through a transparent tube of 3 inches diameter at a rate of one gallon per minute. The transparent tube was irradiated with ten green 215 watt fluorescent lamps generating a total of 350 watts (or 5.6 Einsteins/hr.) of light in the wavelength range of 400 to 600 m$\mu$. After flowing through eight feet of the transparent tube, the temperature of the liquid iron pentacarbonyl had risen to +10° C. and 0.0167 pound of iron enneacarbonyl had been produced per gallon of iron pentacarbonyl with the release of 0.0176 cubic feet of carbon monoxide. The iron pentacarbonyl containing solid iron enneacarbonyl was filtered and the liquid iron pentacarbonyl was collected and recycled. Under these conditions one pound per hour of iron enneacarbonyl was produced.

Example VI

Two units of 10 lamps each were combined to form a double unit of a total length of 16 feet and 10 of these double units were combined to form a train of reactors. The essentially pure iron pentacarbonyl of −10° C. was passed through the transparent piping at a rate of 20 gallons per minute. At the end of the train the temperature had risen to +10° C. and 0.0167 pound of iron enneacarbonyl had been produced per gallon of iron pentacarbonyl with the release of 0.0176 cubic feet of carbon monoxide. The mixture was separated by means of a cyclone in a stream of liquid iron pentacarbonyl which was cooled and recycled and a slurry of iron enneacarbonyl in iron pentacarbonyl which was sent to a filtering means for final separation of the product. Under these conditions 20 pounds per hour of iron enneacarbonyl were produced.

Iron enneacarbonyl has enjoyed only limited commercial success primarily because no suitable economical process has been available to produce it on a commercial scale. However, since iron enneacarbonyl is a solid at ordinary temperatures, it can be more easily shipped and once received by the consumer it can be heated to form iron pentacarbonyl which can be employed in vapor metallurgical techniques. Iron enneacarbonyl can also be rapidly heated to form iron powder which can be employed in powder metallurgical processes or be employed as a catalyst to great advantage since it has a highly active surface. Other uses of iron enneacarbonyl are the direct use of iron enneacarbonyl in powder metallurgy both as a binder and a lubricant or in paint compositions where it is desired to protect exposed iron or steel members. Iron enneacarbonyl can by the process of the present invention be produced on a commercial scale and iron enneacarbonyl can now be economically employed in the above enumerated applications.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for photochemically producing iron enneacarbonyl comprising irradiating essentially pure liquid iron pentacarbonyl with light having a range of wavelengths from about 400 millimicrons to about 700 millimicrons while maintaining the iron pentacarbonyl at a temperature below about +20° C. to form iron enneacarbonyl.

2. A process as described in claim 1 wherein the temperature of the essentially pure liquid iron pentacarbonyl is maintained at between about minus 10° C. and about plus 10° C.

3. A process as described in claim 1 wherein the essentially pure liquid iron pentacarbonyl is diluted with a colorless organic solvent selected from the group consisting of acetic acid, petroleum ether, benzene, toluene and hexane.

4. A process as described in claim 3 wherein the concentration of the essentially pure liquid iron pentacarbonyl in the colorless organic solvent is about 1% to about 95%.

5. A continuous process for photochemically producing iron enneacarbonyl comprising irradiating a flowing stream of essentially pure liquid iron pentacarbonyl at a temperature below about 20° C. with light within the wavelengths of 400 to 700 millimicrons to form iron enneacarbonyl dispersed in said iron pentacarbonyl, separating the iron enneacarbonyl from said liquid pentacarbonyl, cooling the separated iron pentacarbonyl and recycling the cooled iron pentacarbonyl to the irradiation step.

6. A process as described in claim 5 wherein about 93 watts to about 300 watts of light within said wavelengths is supplied to produce about one pound of iron enneacarbonyl.

7. A process as described in claim 6 wherein the wavelength of the irradiating light is about 450 m$\mu$ to about 600 m$\mu$.

8. A process as described in claim 6 wherein the dispersed iron enneacarbonyl is separated from the liquid iron pentacarbonyl when iron enneacarbonyl approaches a concentration of about 0.15 mole percent.

9. A process for photochemically producing iron enneacarbonyl comprising irradiating essentially pure liquid iron pentacarbonyl containing, per mole of liquid iron pentacarbonyl, less than $3.10^{-4}$ mole of dissolved iron enneacarbonyl, less than $10^{-6}$ mole of $Fe_3(CO)_{12}$, less than $10^{-2}$ mole of $Ni(CO)_4$, less than about $10^{-6}$ mole of $Co_2Fe(CO)_9S$ and less than about $10^{-2}$ mole of $Co_2(CO)_8$ with light within the wavelength of about 400 m$\mu$ to about 700 m$\mu$ while maintaining the temperature of the liquid iron pentacarbonyl below about $+20°$ C. to form iron enneacarbonyl.

10. A process for continuously photochemically producing iron enneacarbonyl comprising irradiating a flowing stream of essentially pure liquid iron pentacarbonyl containing, per mole of liquid iron pentacarbonyl, less than about $3.10^{-4}$ mole of dissolved iron enneacarbonyl, less than about $10^{-6}$ mole of $Fe_3(CO)_{12}$, less than about $10^{-2}$ mole of $Ni(CO)_4$, less than about $10^{-6}$ mole of $Co_2Fe(CO)_9S$ and less than about $10^{-2}$ mole of $Co_2(CO)_8$ with light in the wavelength of about 400 m$\mu$ to about 700 m$\mu$ while maintaining the temperature of the liquid iron pentacarbonyl below about $+20°$ C. to form iron enneacarbonyl, separating the liquid iron pentacarbonyl from the iron enneacarbonyl and recycling the separated liquid iron pentacarbonyl to the irradiation step.

References Cited

UNITED STATES PATENTS

| | | | |
|---|---|---|---|
| 1,679,256 | 7/1928 | Mueller et al. | 204—158 |
| 2,604,442 | 7/1952 | Lambert et al. | 204—157.1 |
| 2,948,667 | 8/1960 | Limido et al. | 204—163 |

HOWARD S. WILLIAMS, *Primary Examiner.*